(12) United States Patent
Murakami

(10) Patent No.: US 7,970,302 B2
(45) Date of Patent: Jun. 28, 2011

(54) IMAGE FORMING APPARATUS AND PRINTING METHOD THEREFOR

(75) Inventor: Reiji Murakami, Kanagawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/897,767

(22) Filed: Oct. 4, 2010

(65) Prior Publication Data

US 2011/0020021 A1   Jan. 27, 2011

Related U.S. Application Data

(63) Continuation of application No. 12/199,424, filed on Aug. 27, 2008, now Pat. No. 7,831,160.

(60) Provisional application No. 60/982,109, filed on Oct. 23, 2007.

(51) Int. Cl.
*G03G 15/00* (2006.01)
(52) U.S. Cl. .......................... 399/45; 356/630; 399/389
(58) Field of Classification Search .................... 399/45, 399/389; 271/145; 356/630, 632, 503; 250/559.27
See application file for complete search history.

(56) References Cited

U.S. PATENT DOCUMENTS

| | | |
|---|---|---|
| 6,636,704 B2 | 10/2003 | Weaver et al. |
| 6,823,148 B2 | 11/2004 | Weaver et al. |
| 7,490,828 B2 | 2/2009 | Machida et al. |
| 7,663,769 B2 | 2/2010 | Hayashihara et al. |
| 2003/0016959 A1 | 1/2003 | Fujikura et al. |
| 2004/0146310 A1 | 7/2004 | Ohta et al. |
| 2007/0110464 A1 | 5/2007 | Nakayama et al. |

FOREIGN PATENT DOCUMENTS

JP   2005-104723   4/2005

*Primary Examiner* — Sophia S Chen
(74) *Attorney, Agent, or Firm* — Patterson & Sheridan, LLP

(57) ABSTRACT

An image forming apparatus according to an embodiment of the present invention includes an apparatus main body, an image creating unit that is provided in the apparatus main body and creates an image to be printed on recording paper, a paper feeding mechanism on which plural pieces of the recording paper are stacked as a paper bundle, a paper-type distinguishing device that distinguishes a type of the recording paper from the paper bundle stacked on the paper feeding mechanism, and a printing unit that prints, according to the type of the recording paper distinguished by the paper-type distinguishing device, the image created by the image creating unit on the recording paper.

20 Claims, 9 Drawing Sheets

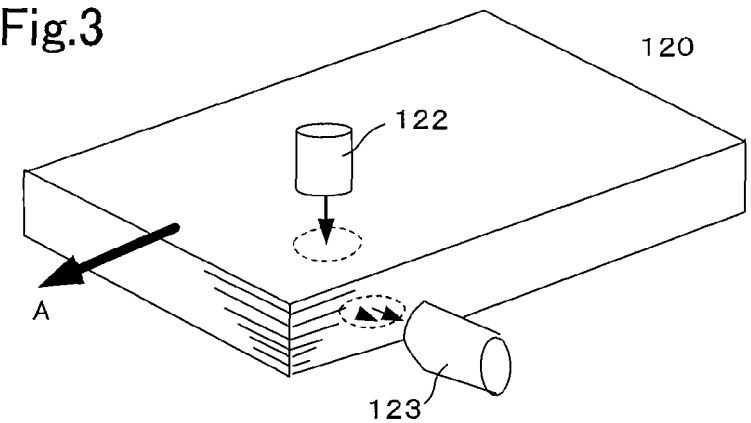
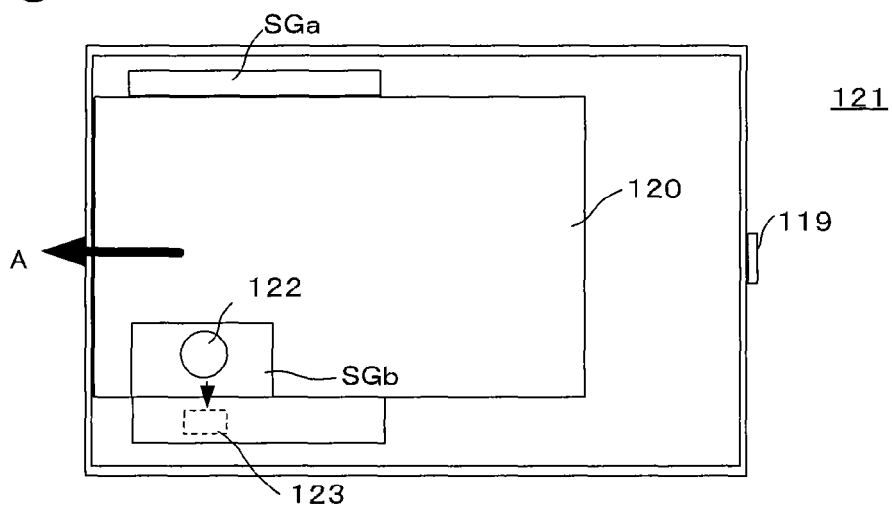
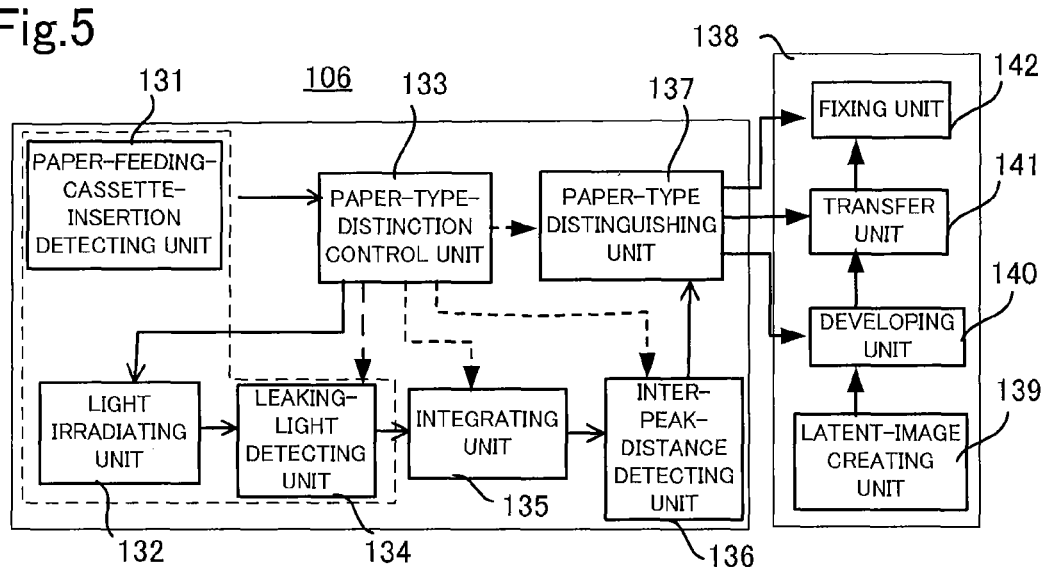

IMAGE FORMING APPARATUS AND PRINTING METHOD THEREFOR

CROSS-REFERENCE TO RELATED APPLICATION

This application is a continuation of U.S. patent application Ser. No. 12/199,424, filed Aug. 27, 2008, now U.S. Pat. No. 7,831,160 which is based upon and claims the benefit of the priority of the U.S. provisional application No. 60/982,109 filed on Oct. 23, 2007. The entire contents of U.S. patent application Ser. No. 12/199,424 are incorporated by reference herein.

TECHNICAL FIELD

The present invention relates to an image forming apparatus, and, more particularly to an image forming apparatus including a paper-type distinguishing device and a printing method therefor.

BACKGROUND

In image forming apparatuses such as a multifunction color copying apparatus (a multifunction peripheral (MFP)), types of media on which color images and the like are printed are increasing. Even if printing media are limited to paper, various kinds of paper with different thicknesses and the like are used.

Such types of paper are usually distinguished by basis weight (unit; $g/m^2$) indicating weight per a fixed area. For example, types of paper belonging to groups of basis weights 64 to 105, 106 to 163, 164 to 209, 210 to 256, and 257 to 300 are referred to as plain paper, thick paper 1, thick paper 2, thick paper 3, and thick paper 4, respectively. The basis weights depend on the density and the thickness of paper. When the density of the paper is fixed, the basis weights are proportional to the thickness of the paper.

Usually, the basis weights are written on a package of paper. When a user selects one of the groups of basis weights written on the package, a printing condition corresponding to a type of the paper is automatically set.

However, many users do not notice the basis weights written on the package of paper. After the paper is taken out from the package, it is extremely difficult for a general user to learn the basis weights.

Therefore, in recent years, it is attempted to save labor and time of a user by causing a media sensor or the like set in an apparatus to select paper.

Usually, the media sensor distinguishes a paper type by detecting characteristics of paper such as the thickness, the light transmittance, and the like of the paper. To accurately detect the characteristics of the paper, it is preferable to separate pieces of the paper one by one. However, a user feels it annoying to sort out only one piece of paper from a bundle of paper and cause the media sensor to detect characteristics of the paper. Therefore, the media sensor is set along a so-called paper path after a bundle of paper stacked in a paper feeding cassette is separated into one piece of paper. Then, a paper type cannot be distinguished after the one piece of paper reaches the media sensor, i.e., until the paper is separated into one piece of paper immediately before printing.

In general, in an apparatus that forms an image and prints the image, it is preferable to adjust an image forming condition according to characteristics of paper types. It is desirable that a paper type is identified until image formation is started. However, in an apparatus that forms a color image and prints the color image, usually, image formation is performed before one piece of paper is separated from a paper bundle. Therefore, even if a paper type is distinguished at this stage, it is difficult to replace paper of some kind in a printing state with another kind of paper. Even if the paper in the printing state can be replaced with another kind of paper, it is necessary to stop traveling of the paper in the printing state and bring another piece of paper into a printing state. This deteriorates performance of printing.

Therefore, it is proposed to detect characteristics of paper in a state in which a paper bundle is stacked in a paper feeding cassette. For example, in JP-A-2005-104723, a CCD sensor is attached to a position opposed to a side end face of a paper bundle set in a paper feeding tray (a paper feeding cassette) of an image forming apparatus and an image of the side end face of the paper bundle is picked up by this CCD sensor. In this laid-open application, a paper feeding device that detects the thickness and the like of paper from the picked-up image is disclosed.

However, in this method, since shading caused by the paper itself and spaces among pieces of the paper is used, light and shade of the shading hardly occurs and it is difficult to accurately measure the thickness and the like of the paper.

It is described to irradiate light of a light source on the side end face of the paper bundle from obliquely above or obliquely below the side end face in order to increase a difference in the light and shade of the shading. However, when side end positions of the paper bundle are accurately aligned, the difference in the light and shade hardly occurs. On the other hand, when side end positions of the paper bundle are not accurately aligned, fluctuation occurs in the length of the shading and it is difficult to accurately detect the thickness and the like of the paper. Besides, the laid-open application also discloses that up and down movement of the paper bundle is used and the air is blown against the paper bundle from a side of the paper bundle. However, it is still difficult to accurately measure the thickness and the like of the paper.

SUMMARY

The present invention has been devised in view of the problems in the past described above and it is an object of the present invention to provide an image forming apparatus that can accurately distinguish a paper type without sorting out one piece of paper from a paper bundle and does not deteriorate performance of printing and a printing method for the image forming apparatus.

According to an aspect of the present invention, there is provided an image forming apparatus including an apparatus main body, an image creating unit that is provided in the apparatus main body and creates an image to be printed on recording paper, a paper feeding mechanism on which plural pieces of the recording paper are stacked as a paper bundle, a paper-type distinguishing device that distinguishes a type of the recording paper from the paper bundle stacked on the paper feeding mechanism, and a printing unit that changes printing conditions according to the type of the recording paper distinguished by the paper-type distinguishing device and prints the image.

According to another aspect of the present invention, there is provided a paper-type distinguishing method including irradiating light on one surface of a paper bundle including plural pieces of recording paper (hereinafter referred to as paper) stacked on a paper-bundle feeding mechanism and detecting leaking light of the light from a side of the paper bundle to thereby detect characteristics such as the thickness of the paper and distinguish a paper type.

DESCRIPTION OF THE DRAWINGS

FIG. 3 is a diagram showing a relation between a paper bundle and a light source and a light receiving unit of the paper-type distinguishing device in an automatic paper feeding cassette according to the embodiment;

FIG. 4 is a plan view of the automatic paper feeding cassette according to the embodiment;

FIG. 5 is a block diagram showing an electric configuration of the paper-type distinguishing device according to the embodiment;

DETAILED DESCRIPTION

Embodiments of the present invention are explained below with reference to the accompanying drawings. In the explanation of the embodiments, it is assumed that an image forming apparatus is a multifunction color copying apparatus (an MFP).

Figure 1:
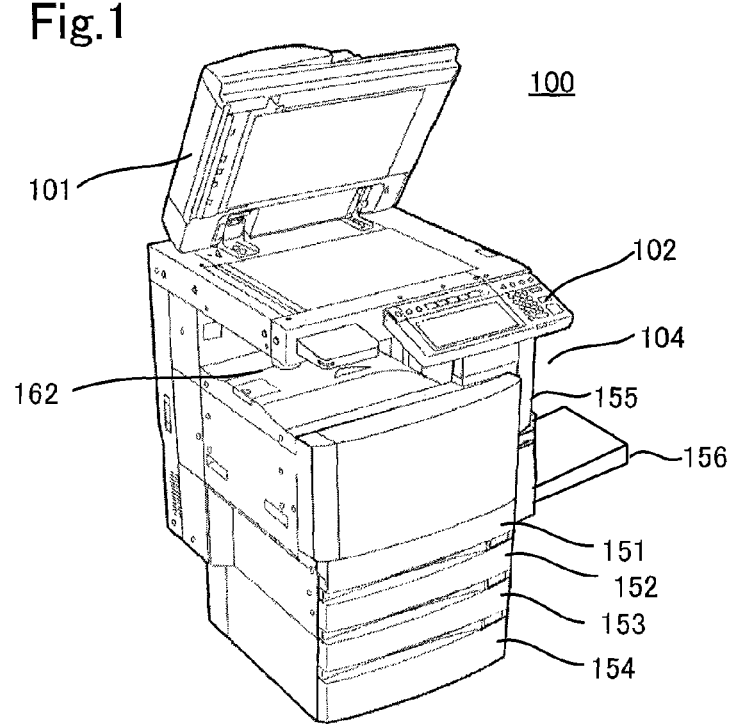
FIG. 1 is a schematic perspective view of a multifunction color copying apparatus according to an embodiment of the present invention.

FIG. 1 is a perspective view showing an example of an appearance of a multifunction copying apparatus according to an embodiment of the present invention.

An auto document feeder (ADF) 101 that also serves as an original cover and automatically feeds sheet-like originals one by one is openably and closably provided in an upper part of an apparatus main body 100. An operation panel 102 including various operation keys and various display devices for instructing copy conditions and copy start is provided in a front section of an upper surface of the apparatus main body 100.

A handle 104 is provided below the operation panel 102 on a front surface of the apparatus main body 100 to allow a user to open the inside of the main body when paper jam or the like occurs.

Paper feeding cassettes 151, 152, 153, and 154 including paper-type distinguishing devices 106 are detachably provided in a lower part of the apparatus main body 100. In each of these paper feeding cassettes, pieces of paper of an identical size and a different paper type are stored in a lateral direction or a longitudinal direction. In printing, the pieces of paper are selected and fed.

An automatic duplex unit 155 for performing duplex copying and a manual feed tray 156 are openably and closably provided in a right side section of the apparatus main body 100. The manual feed tray 156 can be folded when not in use and is used to feed paper not present in an automatic paper feeding cassette. If a paper-type distinguishing mechanism is provided in a paper inserting port, even when several pieces of paper are laid one on top of another and inserted from the paper inserting port, it is possible to distinguish the pieces of paper.

A paper discharge tray 162 that receives printed paper is provided on the opposite side of the apparatus main body 100.

Not-shown terminals such as a parallel port, a serial port, and an SCSI are provided on a rear surface of the apparatus main body 100. The parallel port is a terminal for connecting the apparatus and an external apparatus such as a personal computer (PC) when the apparatus is caused to operate as a printer.

The serial port is a terminal for connecting the apparatus and the external apparatus such as a PC in order to read out internal management information of the apparatus and set functions of the apparatus during maintenance of the apparatus. The SCSI is a terminal for performing communication of commands and data between the apparatus and an external controller that operates as a master.

Figure 2:
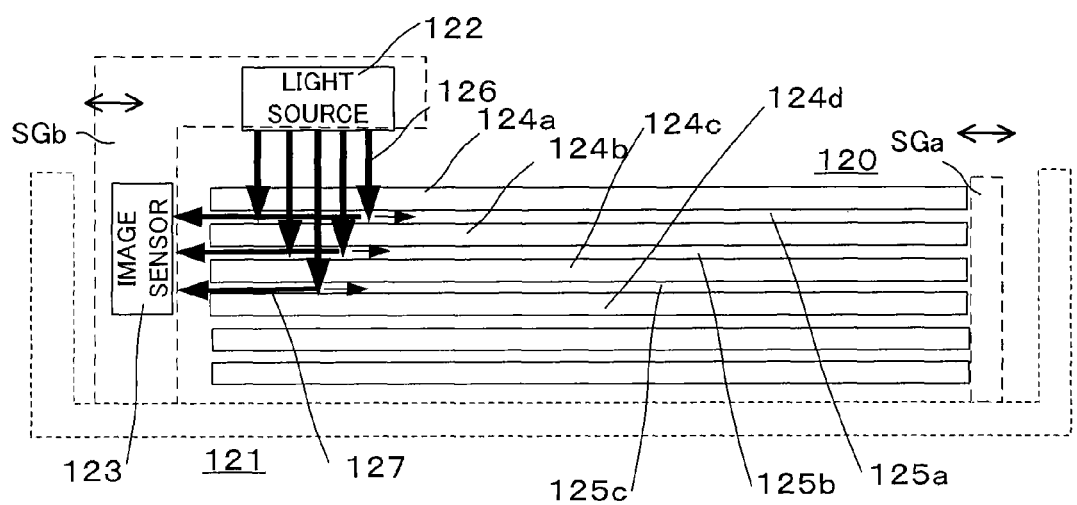
FIG. 2 is a sectional view for explaining a principle of a paper-type distinguishing device according to the embodiment.

FIG. 2 is a diagram for explaining detection of paper thickness in this embodiment performed by irradiating light on a paper bundle 120 from above and receiving leaking light of the light from an end face in a first embodiment of the present invention. FIG. 3 is a diagram showing a relation among the paper bundle 120, a light source 122, and a light receiving device 123 in the first embodiment.

FIG. 4 is a plan view of an automatic paper feeding cassette 121 (e.g., an automatic paper feeding cassette 152) showing a relation between the light source 122 and the light receiving device 123 provided in the first embodiment. The automatic paper feeding cassette 121 is adapted such that the paper bundle 120 taken out from a package can be placed thereon. Side guides SGa and SGb, which are brought into contact with sides of the paper bundle 120, are provided slidably in a width direction of the paper bundle. When the paper bundle 120 is fed, the side guides SGa and SGb are brought into contact with the sides of the paper bundle 120 according to a size of recording paper of the paper bundle 120 and attached to the apparatus main body.

One side guide SGa has a function of simply aligning the paper bundle 120 that is brought into contact with a side thereof and stored therein. In the other side guide SGb, besides a paper bundle aligning function same as that of the side guide SGa, paper-type detecting mechanisms, i.e., a light source 122 and an image sensor 123 for distinguishing a paper type are integrally provided. The side guide SGb has an inverse L shape in section as shown in FIG. 2. The light source 122 is attached to an upper part of the side guide SGb to irradiate light downward. The image sensor 123 is attached to a side of the side guide SGb with a light receiving surface thereof directed to an inner side.

FIG. 5 is a diagram showing an electric configuration of a control system of the paper-type distinguishing device 106 according to this embodiment.

The structure and the control system of the paper-type distinguishing apparatus 106 according to the first embodiment are explained with reference to FIGS. 2 to 5.

The paper-type distinguishing device 106 includes the light source 122 set to irradiate light downward from above the paper bundle 120 and a light receiving device, for example, the image sensor 123 provided to be close to an end of the paper bundle 120. An arrow A indicates a feeding direction of recording paper of the paper bundle 120.

An example of an electric circuit configuration adopted when paper thickness is measured and a paper type is distinguished on the basis of the paper thickness and an example of the configuration adopted when transfer voltage during image formation is changed on the basis of the distinguished paper type are shown in FIG. 5.

The paper-type distinguishing device 106 includes a paper-feeding-cassette-insertion detecting unit 131 that detects, with a cassette-insertion detection switch 119, that the automatic paper feeding cassette 121 is fit in the main body, a paper-type-distinction control unit 133 that receives an insertion detection signal of the paper bundle 120 and instructs a light irradiating unit 132 to irradiate light on the paper bundle 120, a leaking-light detecting unit 134 that detects leaking light from the end of the paper bundle 120 and converts the leaking light into an electric signal, an integrating unit 135 that integrates the electric signal in an end direction of paper, an inter-peak-distance detecting unit 136 that detects a distance between peaks of an integrated optical signal, and a paper-type distinguishing unit 137 that detects the thickness of the paper from the detected inter-peak distance and distinguishes a paper type.

The paper-type-distinction control unit 133 also controls the paper-feeding-cassette-insertion detecting unit 131, the light irradiating unit 132, the leaking-light detecting unit 134, the integrating unit 135, the inter-peak-distance detecting unit 136, and the paper-type distinguishing unit 137. The paper-feeding-cassette-insertion detecting unit 131 (specifically, the cassette-insertion detection switch 119 is included), the light irradiating unit 132, and the leaking-light detecting unit 134 are provided in the automatic paper feeding cassette 121. The other electric sections of the paper-type distinguishing device 106 are provided in the apparatus main body 100.

Mechanical sections of the paper-type distinguishing device 106, i.e., the paper-feeding-cassette-insertion detecting unit 131, the light irradiating unit 132, and the leaking-light detecting unit 134 are desirably provided for each of the automatic paper feeding cassettes. However, the other electric sections can be provided commonly for the automatic paper feeding cassettes. When the electric sections of the paper-type distinguishing device 106 is commonly provided, there is an advantage that cost can be reduced. However, the electric sections of the paper-type distinguishing device 106 may be set near the light source 122 or the image sensor 123 for each of the automatic paper feeding cassettes.

If the paper bundle inserted in the automatic paper feeding cassette 121 is once curled entirely after being taken out of a package, the pieces of recording paper are separated from one another and small spaces are formed among the pieces of paper. This is preferable when paper thickness is measured.

The paper bundle 120 includes plural pieces of recording paper. Light is irradiated from the light source 122 in a thickness direction of the paper bundle 120. Light leaking from an end face of the paper bundle 120 to the outside among the pieces of paper is detected.

The light source 122 is included in the light irradiating unit 132. The light receiving device, i.e., the image sensor 123, is included in the leaking-light detecting unit 134. An operation of the paper-type detecting device 106 for detecting a paper type is described later.

In FIG. 5, an image forming unit 138 includes a latent-image creating unit 139 that scans, for example, an image to be copied and forms an optical latent image, a developing unit 140 that develops, with a toner or the like, the latent image created by the latent-image creating unit 139, a transfer unit 141 that transfers a visible image developed by the developing unit 140, and a fixing unit 142 that fixes the transferred image.

When a paper type is distinguished by the paper-type distinguishing unit 137, information concerning the paper type is transferred to the image forming unit 138. The image forming unit 138 can change, according to the paper type, image creation conditions and conditions for printing on recording paper, for example, transfer voltage of the transfer unit 141, applied voltage during development in the developing unit 140, and fixing temperature for a visible image in the fixing unit 142. If the image formation conditions and the printing conditions are automatically changed according to the paper type in this way, a satisfactory recorded image is always obtained.

If the automatic paper feeding cassette 121 having the structure shown in FIG. 4 is used, the side guide SGb is slid according to a size of the recording paper. The light source 122 of the paper-type distinguishing device 106 and the image sensor 123 are arranged in predetermined positions from the side of the paper bundle 120. Therefore, there is an advantage that it is unnecessary to take the trouble to move the light source 122 and the image sensor 123 according to the size of the recording paper in order to detect leaking light.

Figure 6:
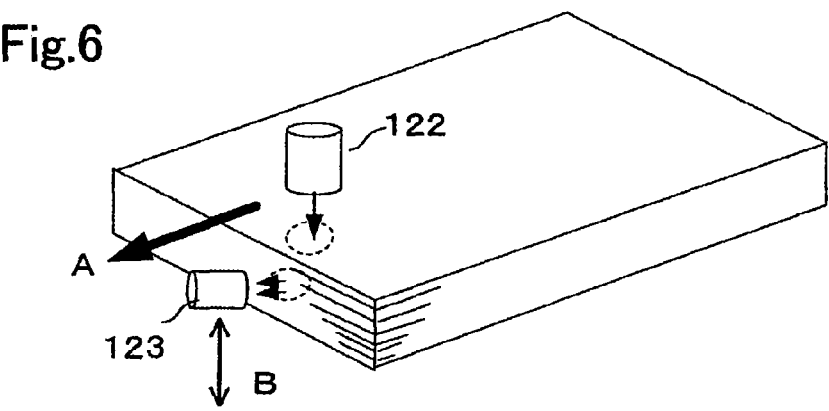
FIG. 6 is a diagram showing a relation between a paper bundle and a light source and a light receiving unit of a paper-type distinguishing device according to another embodiment of the present invention.

In the embodiment, the light irradiated from the upper surface of the paper bundle 120 and leaking from the side thereof with respect to the feeding direction A of the recording paper is received. However, the light receiving device (the image sensor 123), which receives the leaking light, can also detect the leaking light in a front section in the feeding direction A of the recording paper. A paper-type detecting device according to a second embodiment of the present invention is shown in FIG. 6. As it is evident when FIG. 6 is compared with FIG. 3, the image sensor 123 is provided in the front section in the direction A in which the recording paper moves during the feeding of the paper bundle 120. When the image sensor 123 is arranged in this way, it is preferable to retract the image sensor 123 downward or upward as indicated by an arrow B using a not-shown image sensor retracting motor when the recording paper is fed. In this embodiment, since the image sensor 123 can be arranged in the center in the front section of the recording paper, there is an advantage that it is possible to provide the light source in a fixed position above the recording paper of the apparatus main body regardless of a size of the recording paper.

Figure 7:
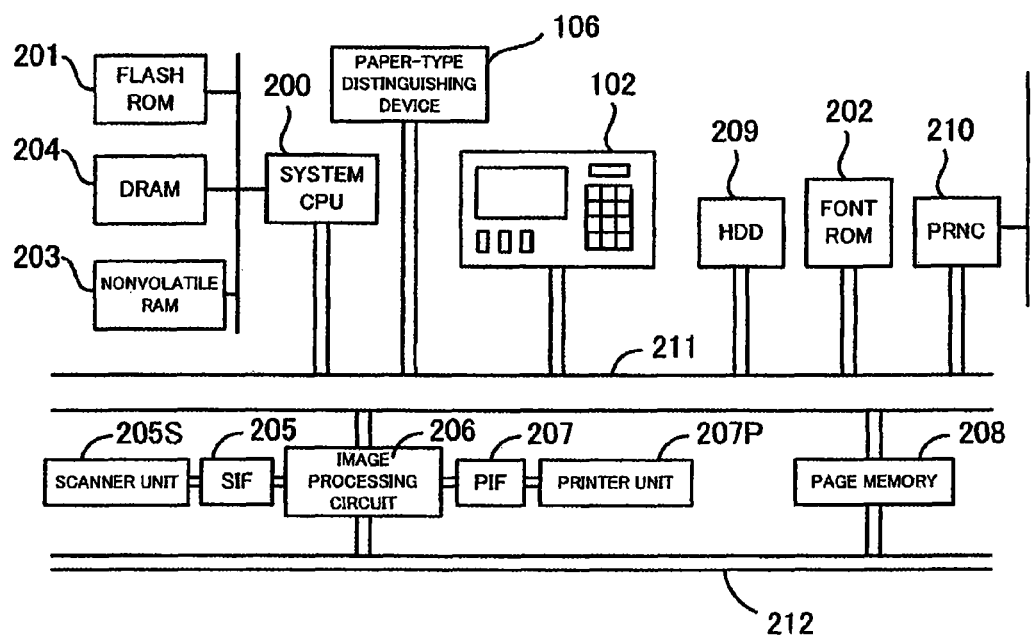
FIG. 7 is a block diagram showing an overall configuration of a copying apparatus according to the embodiment shown in FIG. 1.

FIG. 7 is a block diagram showing a configuration example of a control system of a multifunction color copying apparatus according to this embodiment.

The apparatus includes a system CPU 200, a flash ROM 201 for storing programs and fixed data, a font ROM 202 for converting text data into font data, and a nonvolatile RAM (NVRAM) 203 and a DRAM 204 for work and for data storage.

The system CPU 200 controls the entire apparatus. The system CPU 200 controls functions according to instruction signals from an operation panel 102 by a user, signal inputs from a communication line, and input signals from various external interfaces.

A scanner interface (SIF) 205 receives image data from a scanner unit 205S. The image processing circuit 206 performs image editing processing such as high-image-quality processing corresponding to a recording medium, expansion and reduction processing, pixel thinning-out processing, and void processing for a designated area by marker detection.

A printer interface (PIF) 207 gives image data to a printer unit 207P. A page memory 208 stores, in page units, image data subjected to image processing by the image processing circuit 206 and standby for output. The page memory 208 has a function of a page buffer for temporarily storing image data and incorporates a codec that performs compression and expansion.

Control signals between the system CPU 200 and the respective devices including the paper-type distinguishing device 106 are exchanged at high speed by a system bus 211. On the other hand, the respective devices related to processing of image signals are connected via an image bus 212.

The image bus 212 is a unique bus provided for the apparatus to operate as a copying machine. In order to guarantee real time operations of the copying machine, the image bus 212 performs, in parallel, operations for receiving, in the scanner interface 205, image data inputted from the scanner unit 205S, performing, in the image processing circuit 206, various editing processing such as high-image-quality processing and expansion and reduction processing, and outputting, in the printer interface 207, the image data to the printer unit 207P. This processing is referred to as basic copying. Among boards connected to the image bus 212, a processing board unnecessary for an operation at a certain time is in a state of passage.

A large-capacity storage device, for example, a hard disk driving circuit (HDD) 209 stores image data given from an external apparatus, image data related to printing of plural copies obtained in the scanner unit 205S, and the like.

A printer network controller (PRNC) 210 has an interface with the printer unit 207P that controls an image forming function during a copying operation and a printer operation. At the same time, the printer network controller 210 is connected to a LAN via an incorporated device such as a network interface card. The printer network controller 210 receives print data from a device such as an external personal computer via the LAN, buffers the data, and performs protocol control and data transfer, compression, and expansion control for transferring the data to the printer unit 207P.

Figure 8:
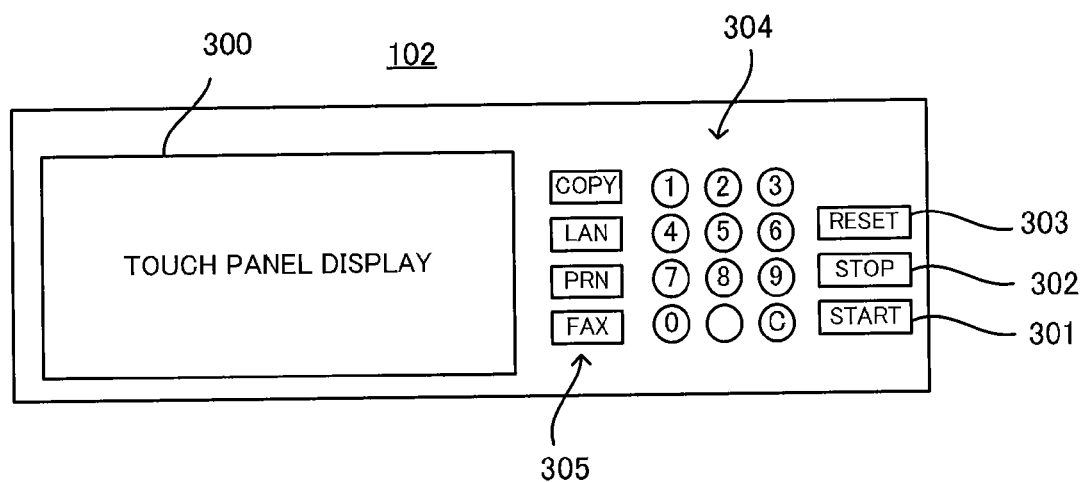
FIG. 8 is a plan view of an operation panel 102 according to the embodiment.

FIG. 8 is a diagram showing a configuration example of the operation panel 102. In the operation panel 102, a touch panel display 300 is provided on a left side thereof and a start key 301, a stop key 302, a reset key 303, a ten key 304 for setting numbers, a function-mode selection key 305 with which function modes such as copy and facsimile can be selected, and the like are provided on a right side thereof. Print is a mode used when printing is performed by connecting a personal computer or the like to the outside.

The ten key 304 is arranged in the same manner as a ten key array of a key telephone unit and the like such that the ten key 304 can be commonly used in copy, facsimile, and print.

Figure 9:
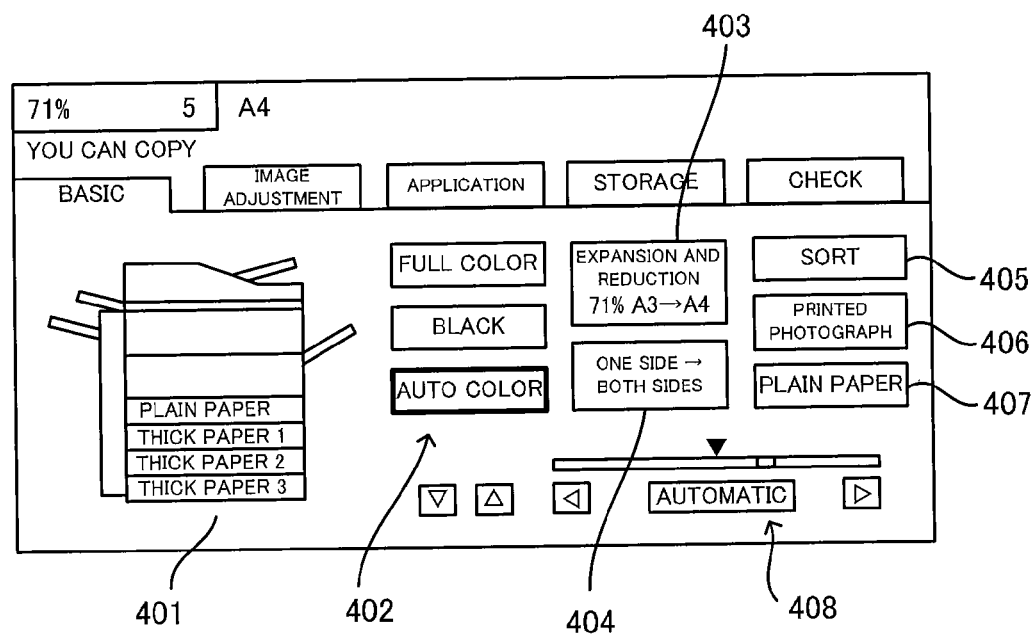
FIG. 9 is a diagram showing a display screen of a touch panel display 300 of the operation panel 102 shown in FIG. 8.

For example, a touch panel guidance screen shown in FIG. 9 is displayed on the touch panel display 300. As modes, there are five modes: a basic mode, an image adjusting mode, an application mode, a storage mode, and a check mode. The user can select one of these modes by touching a tab of the mode displayed on the touch panel display 300.

In the basic mode, as shown in FIG. 9, a main body side icon 401 indicating a side view of a main body of the apparatus is displayed on a left side of the figure. A color and monochrome icon 402 for selecting whether a printed image is color, black, or auto is displayed on a right side of the main body side icon 401. Further on a right side of these icons, a copy magnification icon 403, a one-side or both-side icon 404, a sort icon 405, an image type icon 406, and a paper type icon 407 indicating a type of recording paper are displayed. A density icon 408 in which density is selectably illustrated is displayed under these icons.

The paper type icon 407 is displayed in association with the paper types, i.e., plain paper, thick paper 1, thick paper 2, and thick paper 3 stored in the respective automatic paper feeding cassettes 151, 152, 153, and 154 on the left side. Thick paper 4 is fed to the automatic paper feeding cassette 154 at a lowermost stage instead of the thick paper 3. The thick paper 4 is displayed as the paper type icon 407.

In each of the copy magnification icon 403, the one-side or both-side icon 404, the sort icon 405, and the image type icon 406, a select display screen in which the user can select one of plural options of magnifications, printing modes, sorting, or image types by touching the icons is displayed. When the user touches one of the plural options on the select display screen and selects the option, the selected option is displayed in the icon on the display screen shown in FIG. 9.

For example, the user touches the one-side or both-side icon 404 and selects whether an original has an image on one side or both sides thereof and whether the image is printed on one side or both sides of paper. For example, when the user selects to print a both-side original on one side of paper, the one-side or both-side icon 404 shown in FIG. 9 is displayed as "both sides→one side".

Figure 10:
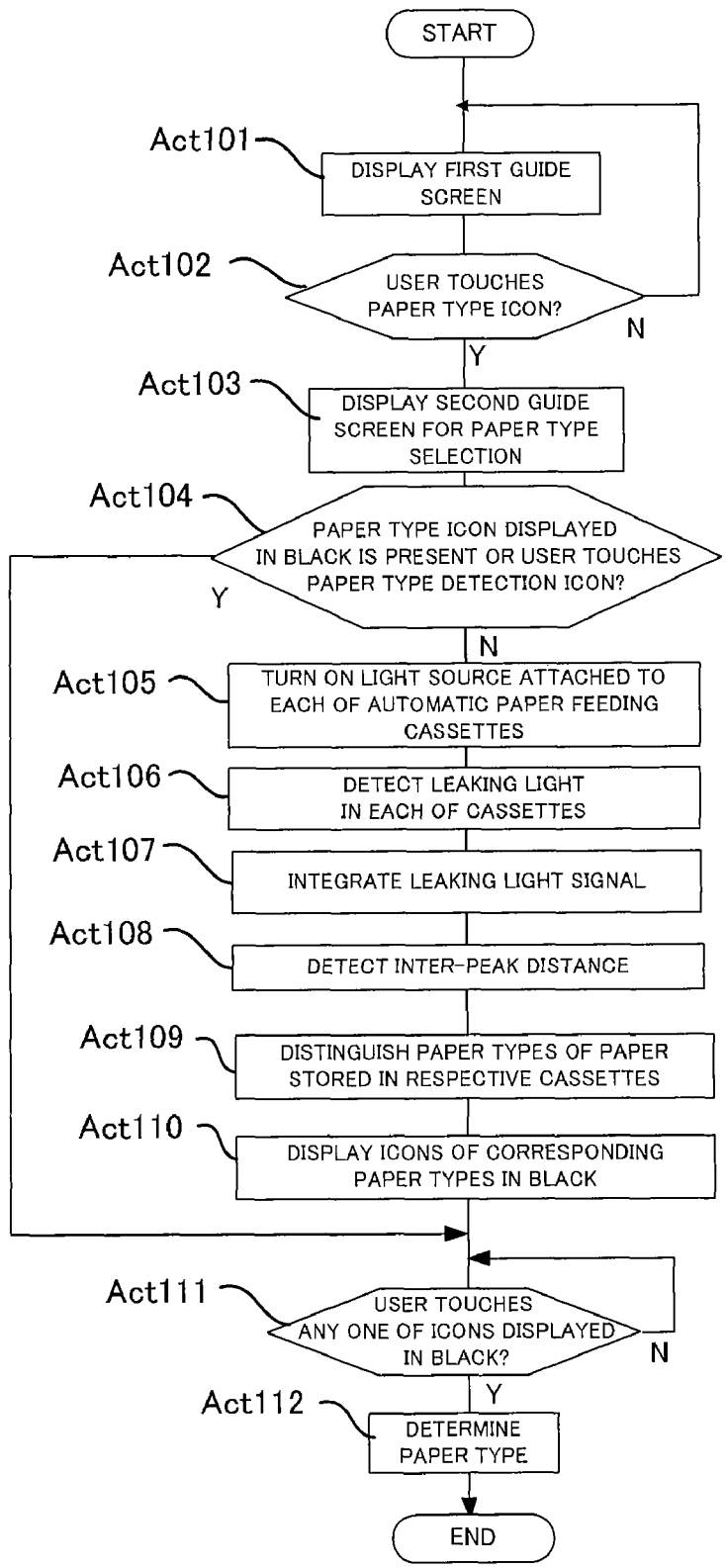
FIG. 10 is a flowchart for explaining operations of a paper-type distinguishing device 106 according to the embodiment.

In an initial state, printing is performed on the premise that recording paper is the plain paper. The plain paper is displayed in the paper type icon 407. Operation performed by the paper-type distinguishing device 106 when the paper bundle 120 is stored in the automatic paper feeding cassette 121 and housed in the main body by the user are explained with reference to FIG. 10.

In Act 101, the touch panel guidance screen shown in FIG. 9 is displayed as a first guide screen. In Act 102, the paper-type-distinction control unit 133 detects, according to whether the user touches the paper type icon 407, whether a paper type should be changed.

When the user touches the paper type icon 407, in Act 103, as shown in FIG. 1, for example, a paper type detection guidance screen in which icons of paper types are arranged is displayed as a second guide screen (Act 103).

In this case, icons 421, 422, 423, 424, and 425 of the plain paper, the thick paper 1, the thick paper 2, the thick paper 3, and the thick paper 4 and an icon 426 in which an indication "paper type detected" is displayed are displayed. An indication "please select a paper type" is displayed above these icons.

The five icons 421, 422, 423, 424, and 425 correspond to the respective automatic paper feeding cassettes and the respective paper types. When there are only the four automatic paper feeding cassettes 151, 152, 153, and 154, only paper of the maximum four types among the five types of paper can be fed to the automatic paper feeding cassettes. Therefore, when, for example, the plain paper, the thick paper 1, the thick paper 2, and the thick paper 3 are stored in advance in the automatic paper feeding cassettes 151, 152, 153, and 154, the icon 425 of the thick paper 4 is displayed in white and cannot be selected.

When four of the five icons are black and selectable, the user only has to select paper corresponding to any one of the icons.

Therefore, in Act 104, the paper-type-distinction control unit 133 detects whether there are icons that are black and selectable among the five paper type icons 421, 422, 423, 424, and 425. The paper type icons displayed in black mean that paper of the paper types is stored in the automatic paper feeding cassettes. Therefore, as described later, the user selects a desired paper type looking at the paper type icons displayed in black.

In the case of No in Act 104, i.e., when all the five paper type icons 421, 422, 423, 424, and 425 are displayed in white, the paper-type-distinction control unit 133 transmits a light irradiation start signal to the light irradiating unit 132 and shifts from Act 104 to Act 105. When the user presses the paper type detection icon 426 in order to check paper types stored in the respective automatic paper feeding cassettes, similarly, the paper-type-distinction control unit 133 transmits the light irradiation start signal to the light irradiating unit 132 and shifts from Act 104 to Act 105.

In Act 105, the light source 122 shown in FIG. 3 incorporated in each of the automatic paper feeding cassettes is turned on according to the control by the paper-type-distinction control unit 133.

In Act 105, the light source 122 irradiates, for example, light circular in section on the upper surface of the paper bundle 120 from above. The light source 122 and the paper bundle 120 are desirably spaced apart to come into light contact with each other. This is because, when the light irradiated from the light source 122 penetrates the paper bundle 120 as deep as possible, leaking light is intense and measurement of paper thickness and the like by an electric signal of the light is easy and it is possible to prevent the light irradiated from the light source 122 from directly entering the image sensor 123 and adversely affecting the leaking light.

When the light source 122 and the image sensor 123 are provided integrally with the side guide SGb as in the automatic paper feeding cassette 121 according to this embodiment shown in FIG. 4, the light source 122 and the image sensor 123 can be always set in a fixed relation with respect to the paper bundle 120.

Figure 11:
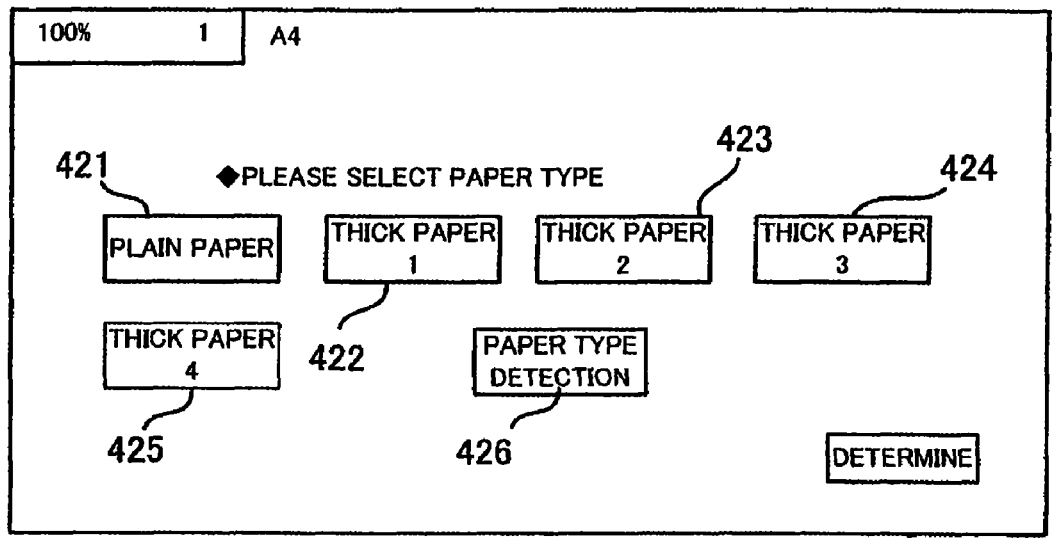
FIG. 11 is a diagram showing a display screen of the touch panel display 300 in automatically detecting a paper type in FIG. 10.

In the embodiment shown in FIG. 6, the light source 122 and the image sensor 123 are moved as described below. To bring the light source 122 closer to the paper bundle 120 when the leaking light is detected, usually, the light source 122 is separated by a not-shown retraction motor. When all the paper type icons shown in FIG. 11 are displayed in white, immediately before instructing the light irradiating unit 132 to irradiate light, the paper-type-distinction control unit 133 only has to mechanically perform control to bring the light source 122 closer to recording paper at the top of the paper bundle 120 and move the image sensor 123 upward to be located in front of the paper bundle 120.

The light source 122 is brought into light contact with the surface of the paper of the paper bundle 120 by a mechanism having the retraction motor or the like as a driving source. When the detection of the leaking light is finished, the light source 122 only has to be separated from the paper bundle 120 again. In this way, a paper-type distinguishing device that can accurately perform detection of paper characteristics by the leaking light and has high operability is obtained.

However, when a light blocking plate or the like is provided to prevent the light irradiated on the paper bundle 120 from entering the image sensor 123, it is also possible to separate the light source 122 from the paper bundle 120 by a certain degree.

In FIG. 2, in the paper bundle 120, top (first) paper 124a, second paper 124b, third paper 124c, and fourth paper 124d are stacked in this order. A space 125a is formed between the first paper 124a and the second paper 124b, a space 125b is formed between the second paper 124b and the third paper 124c, and a space 125c is formed between the third paper 124c and the fourth paper 124d. Spaces are formed among pieces of paper stacked below the fourth paper 124d.

Since paper is an aggregate of fibers, a part of the irradiate light is reflected on the surface of the paper but the other part of the irradiated light is transmitted trough the paper. In other words, a part of irradiated light 126 of the light source 122 is scattered and reflected from the first paper 124a but the remaining light is diffused and propagated through the paper 124a. A part of the remaining light is transmitted through the paper 124a and reaches the space 125a. A part of the light that reaches the space 125a is reflected by the second paper 124b and propagated in the space 125a in a lateral direction. However, the remaining light is diffused and propagated through the second paper 124b and a part thereof reaches the space 125b.

A part of the light that reaches the space 125b is reflected by the third paper 124c and propagated in the space 125b in the lateral direction. However, the remaining light is diffused and propagated in the third paper 124c and a part thereof reaches the space 125c. In the same manner, the irradiated light 126 sequentially passes through the respective pieces of paper from the first paper 124a of the paper bundle 120 while being attenuated. A part of the light leaks from the spaces among these pieces of paper. Leaking light 127 is received by the image sensor 123 of the leaking-light detecting unit 134 (Act 106).

Figure 12:
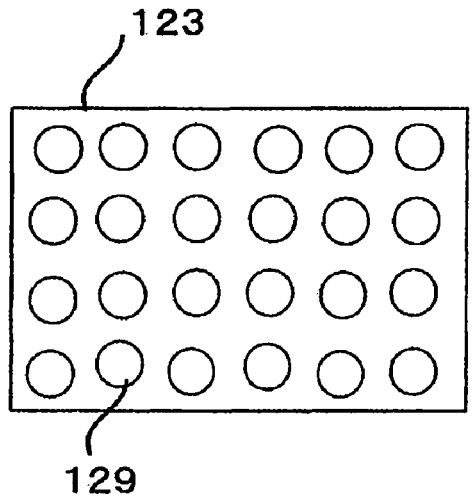
FIG. 12 is a diagram showing a two-dimensional array of CCD light receiving elements as an example of an image sensor of the paper-type distinguishing device.

As the image sensor 123, for example, as shown in FIG. 12, a two-dimensional sensor in which CCD light receiving elements 129 are two-dimensionally disposed in an X axis direction and a Y axis direction can be used. In FIG. 12, the CCD light receiving elements 129 are shown large. However, actually, since a large number of light receiving elements are highly densely disposed, the two-dimensional sensor is formed. Light leaking from the end of the paper bundle 120 to the outside, i.e., leaking light, is converted from a light signal into an electric signal in the leaking-light detecting unit 134.

Figure 13:
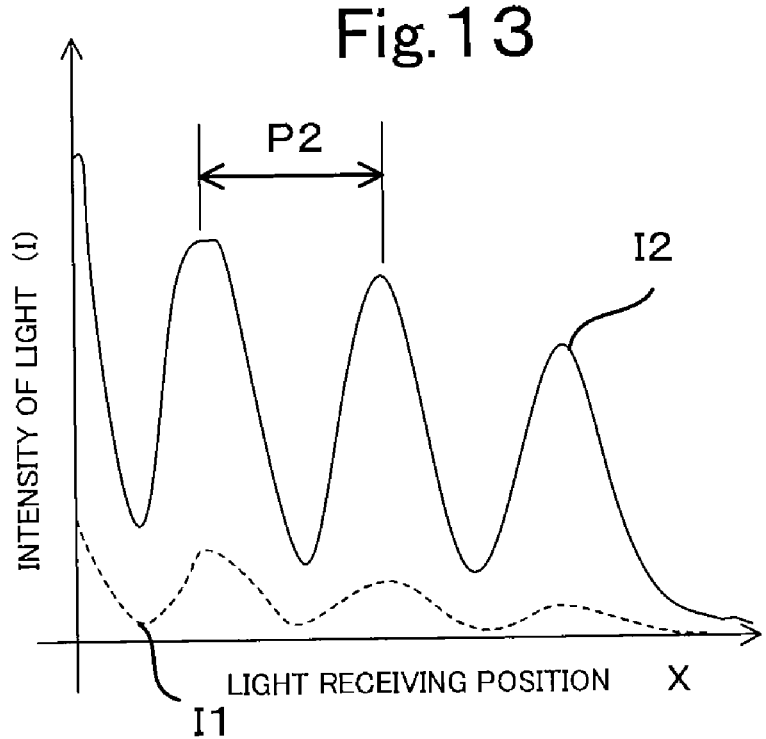
FIG. 13 is a diagram showing an example of a leaking light curve I1 and an integrated leaking light curve I2.
Figure 14:
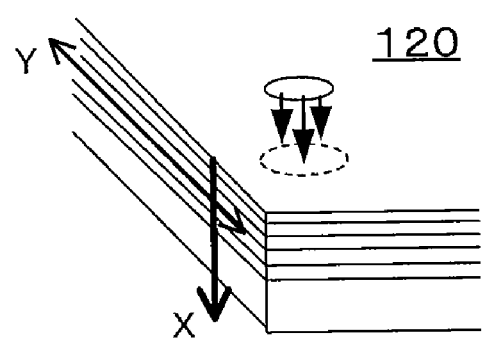
FIG. 14 is a diagram showing a thickness direction (an X axis) and a direction (a Y direction) perpendicular to the thickness direction of a paper bundle.

An example of measurement of light received by the image sensor 123 is shown in FIG. 13. In the figure, the abscissa (X axis) indicates a position in an X direction shown in FIG. 14, i.e., a direction from a first piece of paper to a second piece of paper of the paper bundle 120 and the ordinate indicates the intensity of the light in the position.

An electric signal corresponding to the intensity of the light in a certain position in the X axis direction forms a leaking light curve I1 indicated by a dotted line. This light signal is integrated in a lateral direction, i.e., a direction (a direction indicated by Y in FIG. 14) substantially perpendicular to a light irradiating direction on an end face by the integrating unit 135 shown in FIG. 5. Then, the electric signal of the light intensity forms an integrated leaking light curve I2 indicated by a dotted line in FIG. 13. A difference between a maximum value and a minimum value of the light intensity indicated by the integrated leaking light curve I2 is larger than a difference between a maximum value and a minimum value of the light intensity indicated by the leaking light curve I1 (Act 107).

The "direction substantially perpendicular to the light irradiating direction" means that leaking light in the Y direction only has to be obtained and the direction does not always have to be perpendicular.

An interval between a position of a certain maximum value and a position of a maximum value adjacent thereto or an interval between a position of a certain minimum value and a position of a minimum value adjacent thereto in the leaking light curve I1 and the integrated leaking light curve I2 is referred to as inter-peak distance.

In Act 108, the inter-peak-distance detecting unit 136 measures, for example, an inter-peak distance of maximum values of the light intensity. In FIG. 13, an inter-peak distance P2 corresponds to the thickness of the second piece of paper.

When the electric signal of the leaking light obtained from the side of the paper bundle 120 is integrated in the direction substantially perpendicular to the direction of the irradiated light, a difference between peak values increases. There is an advantage that distances among the pieces of paper can be easily measured and paper thickness can be accurately measured. However, in the present invention, it is not always necessary to integrate the leaking light in the lateral direction.

In Act 109, the paper-type distinguishing unit 137 shown in FIG. 5 distinguishes a paper type from the inter-peak distance measured by the inter-peak-distance detecting unit 136. This paper type distinction is applied to paper stored in all the automatic paper feeding cassettes by a common electric circuit by using the light sources 120 and the image sensors 123 provided in the automatic paper feeding cassettes 152, 153, and 154, respectively.

In this way, automatic detection of paper types of the paper stored in the respective automatic paper feeding cassettes is performed by the paper-type distinguishing device 106. The paper type icons 421 to 427 corresponding to the paper types of the paper are indicated in black, i.e., in black frames (Act 110). The user presses any one of the icons displayed in the black frames and selects any one of the paper types. The selection of the icon by the user is detected in Act 111. In the next Act 112, the paper type is determined in this way.

The paper type of the paper selected and determined by the user is displayed in the paper type icon 407 of the touch panel guidance screen shown in FIG. 9.

Although not shown in the flowchart, when paper types are distinguished and a specific paper type is selected by the user, as shown in FIG. 5, it is also possible to change a transfer voltage of an image in the transfer unit 141 of the image forming unit 138 according to the paper type.

The main body side icon 401 displays an overall situation of the apparatus main body and is used for, for example, indicating the automatic paper-feeding cassettes in which paper is stored and a place of failure.

In an upper left section of the touch panel display 300, for example, an expansion or reduction magnification, the number of copies, and a size of paper presently set in the apparatus are displayed.

For example, when the user takes five copies, the user switches the function mode selection key 305 to copy, touches the one-side or both-side icon 404 to thereby select desired processing such as duplex copy, and, then, presses the key "5" of the ten key 304.

Then, this number is displayed in an upper right area on the touch panel display 300. After confirming the number, the user sets an original and presses the start key 301. Then, a copy operation is started and five copies of the original are taken.

Figure 15:
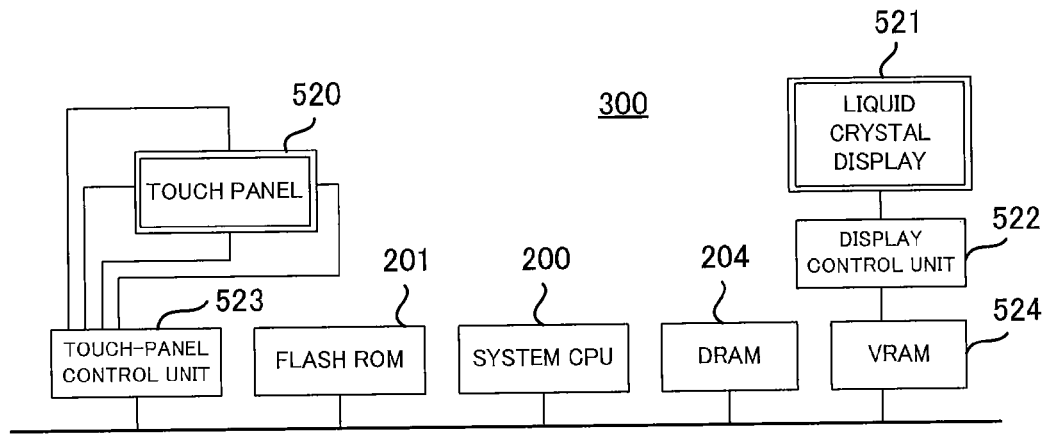
FIG. 15 is a block diagram showing an electric configuration of the touch panel display 300.

FIG. 15 is a block diagram showing an electric configuration of the touch panel display 300.

The touch panel display 300 is configured by placing a touch panel 520 on a liquid crystal display 521. In the touch panel 520, a transparent resistor is uniformly applied to a transparent substrate and a transparent electrode group is disposed in parallel at predetermined distance intervals in X and Y directions.

Under the control by a touch-panel control unit 523, voltage is sequentially applied to the transparent electrodes in the X and Y directions of the touch panel 520 in fixed directions, respectively. Operation for indicating a position on the touch panel 520 is performed by using a dedicated conductive pen or a finger.

The touch-panel control unit 523 monitors a resistance value between the electrodes in the X and Y directions and, according to an indication by the conductive pen or the finger, detects, by calculation based on the resistance value between the electrodes, a position where the resistance value locally decreases.

A display control unit 522 for driving display of the liquid crystal display 521 is connected to the liquid crystal display 521. A video RAM (VRAM) 524 that stores display data in display pixel units is connected to the display control unit 522.

In the touch panel display 300 including the configuration described above, position data obtained by the touch-panel control unit 523 is read by the system CPU 200 (see FIG. 7) in a main control unit. Processing corresponding to this position data is executed by the system CPU 200. For example, when handwriting input is performed, data on the video RAM 524 corresponding to a position indicated on the touch panel 520 is inverted from a non-display state to a display state. The touch panel display 300 can be used for a wide range of applications such as input of an operation parameter by a keyboard display displayed on the liquid crystal display 521 and selection out of a group of various setting buttons.

Figure 16:
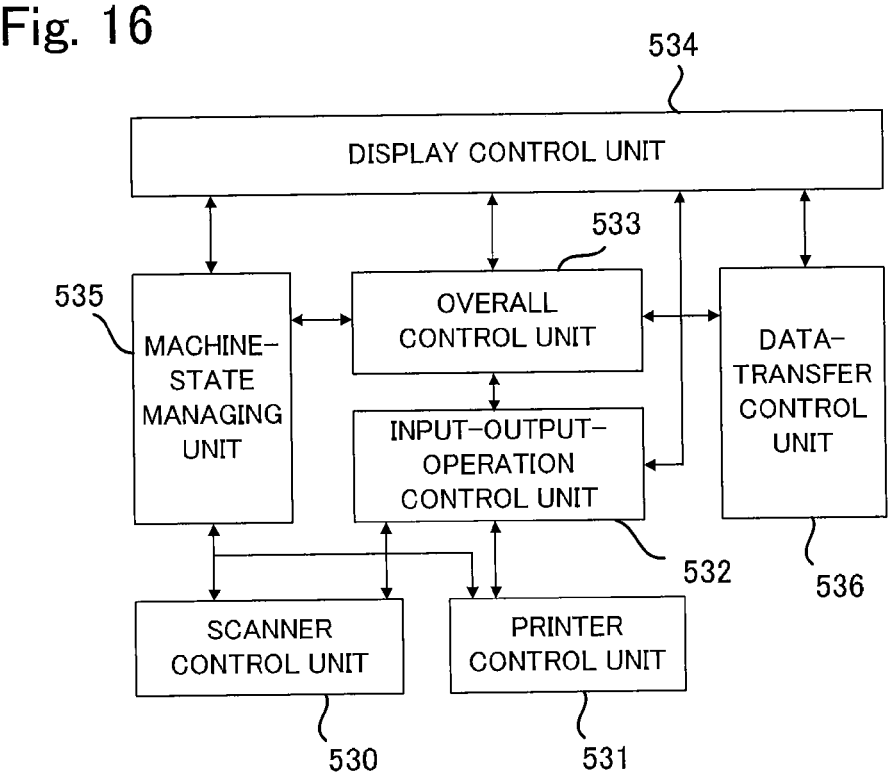
FIG. 16 is a block diagram showing an overall electric configuration according to the embodiment.

FIG. 16 is a block diagram showing a functional configuration of a control unit in a multifunction color copying apparatus according to this embodiment. This control unit corresponds to control units of elements such as the system CPU 200 that executes programs and fixed data stored in the flash ROM 201 shown in FIG. 7 and the touch panel control unit 523. However, functionally, the control unit can be as shown in FIG. 16.

A scanner control unit 530 corresponds to a scanner control ASIC, scanner control firmware that performs scanner driving control during image input, ADF control, and the like, and an image processing unit for pre-processing that performs shading correction and the like. The scanner control unit 530 is mounted on the scanner unit 205S shown in FIG. 7.

A printer control unit 531 corresponds to a printer control ASIC, an output-side image processing ASIC, a printer operation control firmware that performs printer control during printing, paper conveyance control, and the like, and a printer-side image processing firmware mounted on a printer unit 207P.

The printer control unit 531 has an interface with a printer driver of a personal compute or the like and performs command communication control for a control command, a status, and the like and print data communication control. The printer control unit 531 also performs execution control for both print output of image data input from the scanner unit 205S and output of image data returned from the printer driver.

The scanner control unit 530 and the printer control unit 531 have control CPUs, respectively, and realize high-speed control. These control units perform command-status communication with the system CPU 200 shown in FIG. 15, control synchronous operations and the like of a display, a scanner, and a printer, and realize a copying operation and a print output operation of the entire apparatus.

An input-output-control-operation control unit 532 includes an image processing unit and has an interface with the scanner control unit 530 and the printer control unit 531. The input-output-control-operation control unit 532 performs driving timing control for the scanner unit 205S and the printer unit 207P with an operation start command or the like received from an overall control unit 533 as a trigger. At the same time, the input-output-operation control unit 532 performs calculation of image processing parameters and setting for the image processing circuit 406 and controls a copy function.

Timing control means, for example, control of ADF driving timing and scanner driving timing, modification processing for an image expanded in a memory, designation of printing start timing, and input start timing for the next original. The input-output-operation control unit 532 notifies the printer control unit 531 of secure and release commands concerning printer resources received from a display control unit 534.

The display control unit 534 includes display control software for controlling the operation panel 102 of the apparatus explained above with reference to FIGS. 8 and 9. The display control unit 534 conveys operation information of the operation panel 102 to the overall control unit 533. The display control unit 534 receives various state changes, which occur in the apparatus, from a machine-state managing unit 535 as information and reflects the information on display. The display control unit 534 receives information concerning a processing result and progress such as a copy result and the number of copies and size information in copying from the overall control unit 533 and reflects the information on display. A method for the reflection specifically means turn-on of an LED on the operation panel 102 and message display on the liquid crystal display 521.

The overall control unit 533 always monitors an operation state of the entire apparatus and carries out exclusive control of resources shared by plural functions such as the scanner unit 205S and the printer unit 207P, priority operation for copying and print data printing, screen switching operation, and the like. For example, when plural screens are being operated or when the copying is made preferentially executable, the print data printing is prohibited for a fixed period or, conversely, a screen is switched to "display in printing" to limit execution of the copying when the print data printing is started. Further, the overall control unit 533 performs time control such as timer monitoring and appropriately performs, for example, menu switching control for the display control unit 534 according to the state.

The machine-state managing unit 535 monitors states of machines notified from the scanner control unit 530 and the printer control unit 531, specifically, information such as paper jam, jam removal, and front cover opening and closing. The machine-state managing unit 535 notifies the overall control unit 533 and the display control unit 534 of the information to thereby reflect an error state on display or on judgment on whether a copying operation can be executed.

Further, the machine-state managing unit 535 manages, according to an instruction of the overall control unit 533, machine recovery operations performed when an error is eliminated and when a job is finished. The recovery operations in this case mean preparation operations for performing the next copying such as initialization of an indicator position of the scanner unit 205S and a warming-up operation for a heat roller unit.

A data-transfer control unit 536 has a function for data transfer between the apparatus and an external apparatus. The data-transfer control unit 536 includes a printer network controller (PRNC) 210 in FIG. 7. The data-transfer control unit 536 also corresponds to communication control software for communication of control signals and image data between the apparatus and a scanner, a printer, or a digital copying machine connected via a LAN. The printer network controller 210 includes a network interface card (NIC) and a buffer memory.

In the multifunction color copying apparatus, on the operation panel 102 shown in FIG. 8, the user presses any one of the keys in the function mode selection key 305 to select a function. The paper type icon 407 is as described above.

When, for example, the user desires to take copies, the user presses the key of copy and inputs the number of copies using the ten key 304. The user looks at setting displayed on the first guide screen on the touch panel display 300. When the user desires to change the setting, the user touches an icon corresponding to the setting with a finger and changes the setting. When setting includes three or more options, the options are displayed on the second guide screen that appears next. For example, when the user touches the copy magnification icon 403, present magnification and an up-key and a down-key are displayed on the second guide screen. The user can raise the magnification by touching the up-key and can lower the magnification by touching the down-key. When the change of the setting is finished, the user touches the "return" icon (not shown) and returns to the first guide screen. If the setting of the first guide screen displayed on the touch panel display 300 is acceptable, the user presses the start key 301 shown in FIG. 8.

The information designated on the operation panel 102 including the touch panel display 300 is transmitted to the overall control unit 533 via the display control unit 534 shown in FIG. 16 and control of the entire apparatus is performed.

In the case of copying, information designated by the paper type icon 407 or information automatically distinguished and information on the number of copies are transmitted from the display control unit 534 to the input-output-operation control unit 532 via the overall control unit 533 and further transmitted to the printer control unit 531 and controlled such that satisfactory printing is performed according to a paper type.

When each of the modes of LAN, PRN, and FAX is selected in the function mode selection key 305, a selection signal for the function mode is transmitted from the display control unit 534 to the overall control unit 533 and transmitted to the machine-state managing unit 535. The multifunction color copying apparatus is brought into a state suitable for the selected mode.

According to the embodiment, a multifunction color copying apparatus that can automatically, easily, and accurately distinguish a paper type of recording paper and does not extend printing time as a whole even if the user does not know the paper type and does not input the paper type during printing is obtained.

In this embodiment, the multifunction color copying apparatus has the structure in which a paper-type distinguishing mechanism (the light source and the leaking-light detecting unit) is provided in the automatic paper feeding cassette. However, similarly, it is also possible to provide the paper-type distinguishing mechanism in the manual feed tray 156 of the MFP shown in FIG. 1.

Figure 17:
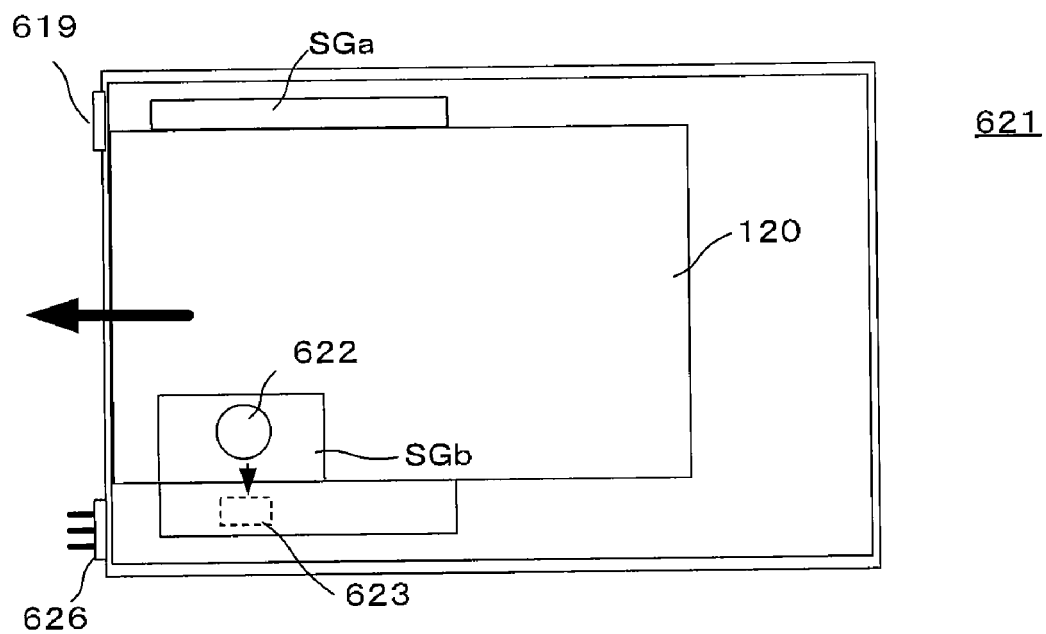
FIG. 17 is a plan view showing an example of a detachable paper feeding cassette.

A plan view of an example of the manual feed tray 156 is shown in FIG. 17 as a detachable paper feeding cassette 621. The detachable paper feeding cassette 621 has the structure same as that of the automatic paper feeding cassette 121 shown in FIG. 4. The detachable paper feeding cassette 621 includes the side guides SGa and SGb that press the paper bundle 120 stored therein from the sides of the paper bundle 120. A light source 622 for irradiating light from above and an image sensor 623 as a light receiving device for detecting leaking light on the side are provided in the side guide SGb.

A cassette-insertion detection switch 619 is provided on an insertion side of the detachable paper feeding cassette 621. A connector section 626 of a lead wire connected to the light source 622 and the image sensor 623 is also provided on the insertion side of the detachable paper feeding cassette 621. Therefore, when the detachable paper feeding cassette 621 is inserted into the apparatus main body, the insertion of the cassette is detected and the paper-type distinguishing mechanism is connected to the electric circuit of the paper-type distinguishing device.

Figure 18:
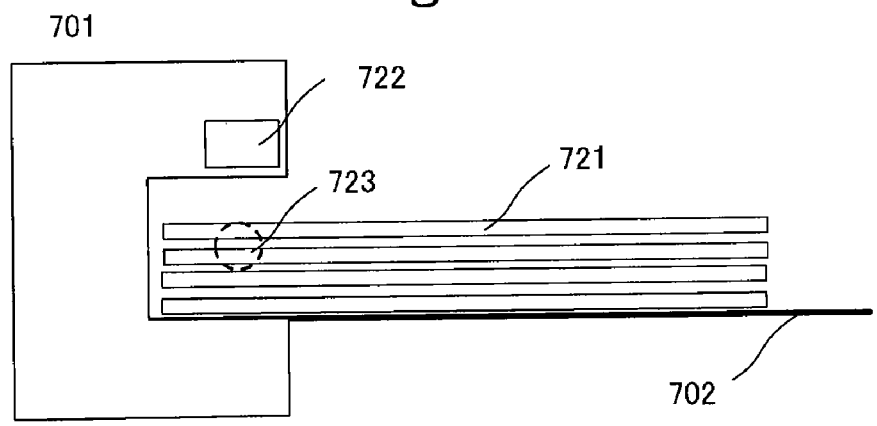
FIG. 18 is a diagram showing an example in the present invention in which pieces of recording paper are laid one on top of another to form a paper bundle in a recording paper inserting port of an apparatus main body.

The present invention can also be applied to manual feed for inserting plural pieces of paper from the paper inserting portion as a paper bundle. The structure viewed from a side as an example of the vicinity of the paper inserting portion in this embodiment is shown in FIG. 18.

Reference numeral 701 denotes a paper inserting port section of the apparatus main body. An inserting tray 702 is provided in a lower part of the paper inserting port section 701. Manual feed paper 721 is stacked on the tray 702 as a paper bundle and inserted. A light source 722 is provided above the paper inserting port. An image sensor 723 is provided, as indicated by a dotted line, on a side where the manual feed paper bundle is placed. In this embodiment, when the manual feed paper bundle is inserted, the insertion can be detected and light is irradiated on the upper surface of the manual feed paper bundle from the light source 722. Leaking light from the manual feed paper can be detected by the image sensor 723.

In this way, in the case of the manual feed printing, it is possible to distinguish a paper type and notify the user of the paper type or change printing conditions according to the paper type. For example, it is possible to change a transfer voltage in the transfer unit 141 of the image forming unit 138 shown in FIG. 6, an applied voltage in visualization of a latent image in the developing unit 140, fixing temperature of the fixing unit 142, and the like.

In both the paper-type distinguishing devices according to the embodiments, light is irradiated from above the paper bundle. However, in the present invention, it is not always necessary to irradiate light from above the paper bundle. For example, light may be irradiated from below the paper bundle and leaking light of the light may be detected at an end of the paper bundle. When the paper bundle is inserted into the inserting port in a vertical state rather than in a flat state, since light is irradiated on the paper bundle from the lateral direction, it is possible to detect the leaking light at an end of the paper bundle.

In short, in the present invention, it is sufficient that light is irradiated substantially perpendicularly on a plane of a paper bundle including plural pieces of recording paper and light leaking from an end of the paper bundle among the pieces of recording paper in a thickness direction of the paper bundle is detected. The end of the paper bundle in this case does not mean a portion of a short side of the recording paper. The leaking light may be detected from a portion of a long side of the recording paper.

In the embodiments, the image sensor includes the two-dimensional CCD light receiving elements. However, in the present invention, two-dimensional light receiving elements are not always necessary. It is also possible to use a one-dimensional optical sensor provided near an end face of a paper bundle including plural pieces of paper in a thickness direction of the paper bundle.

In the explanation of the embodiments, a paper thickness is detected by the leaking light from the end of the paper bundle and the paper type is distinguished. However, a distribution of the leaking light shown in FIG. 13 has a characteristic that the distribution depends not only on paper thickness but also on the density of paper and the like. Therefore, for example, the paper-type distinguishing device 106 can also detect characteristics of the paper, i.e., density and the like, from the distribution of the leaking light, calculate a value equivalent to basis weight, and distinguish a paper type.

In the explanation of the embodiments, the present invention is applied to the multifunction color copying apparatus. However, the present invention can be applied not only to the multifunction color copying apparatus but also to other image forming apparatuses such as a normal copying machine, a printer, and a facsimile that have image creating units, which create images to be printed on recording paper, and designate types of paper on which the images are printed.

Obviously, many modifications and variations of this invention are possible in light of the above teachings. It is therefore to be understood that within the scope of the appended claims, this invention may be practiced otherwise than as specification described.

What is claimed is:

1. A sheet type detector, comprising:
   a light emitter configured to emit light on a plane surface of a sheet bundle which comprises a plural of sheets;
   a movable wall configured to contact the plural of sheets;
   a light receptor configured to generate signal according to the light leaked through gaps between each of the plural of sheets in contact with the movable wall; and
   a sheet detector that detects a thickness of the sheets according to the signal.

2. The detector of claim 1, further comprising an integrator configured to integrate the signal to provide to the sheet detector.

3. The detector of claim 1, further comprising a peak detector configured to detect peaks of the signal in a direction of the thickness.

4. The detector of claim 3, wherein the sheet detector detects a distance between the peaks detected by the peak detector as the thickness.

5. The detector of claim 1, wherein the movable wall supports the light emitter.

6. The detector of claim 5, wherein the movable wall moves together with the light emitter.

7. The detector of claim 5, wherein the movable wall further supports the light receptor.

8. The detector of claim 7, wherein the movable wall moves with the light receptor and the light emitter.

9. The detector of claim 1, wherein the movable wall supports the light receptor.

10. The detector of claim 7, wherein the movable wall moves together with the light receptor.

11. The detector of claim 1, further comprising a heater configured to heat the sheet.

12. The detector of claim 11, wherein the temperature of the heater is changed according to the thickness of the sheets detected by the sheet detector.

13. A method for detecting type of a sheet, comprising:
    setting a plural of sheets in contact with a movable wall;
    emitting light on a plane surface of a sheet bundle which comprises the plural of sheets;

receiving the light leaked through gaps between each of the plural of sheets in contact with the movable wall to generate a signal; and detecting a thickness of the sheets according to the signal.

14. The method of claim 13, further comprising integrating the signal to utilize in the detecting.

15. The method of claim 13, further comprising detecting peaks of the signal in a direction of the thickness.

16. The method of claim 13, further comprising moving the movable wall together with the light emitter.

17. The method of claim 13, further comprising moving the movable wall together with the light receptor.

18. The method of claim 13, further comprising moving the movable wall together with the light receiver and the light receptor.

19. The method of claim 13, further comprising heating the sheet.

20. The method of claim 19, further comprising changing temperature of the heater according to the thickness.

* * * * *